(12) United States Patent
McIntyre et al.

(10) Patent No.: US 7,106,897 B1
(45) Date of Patent: Sep. 12, 2006

(54) UNIVERSAL SPATIAL PATTERN RECOGNITION SYSTEM

(75) Inventors: Michael G. McIntyre, Austin, TX (US); James E. Morris, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 686 days.

(21) Appl. No.: 10/134,718

(22) Filed: Apr. 29, 2002

(51) Int. Cl.
*G06K 9/00* (2006.01)

(52) U.S. Cl. .................. 382/145; 382/199; 382/224; 382/278; 438/14

(58) Field of Classification Search ............... 382/149, 382/141, 145, 156, 168, 173, 199, 224, 225, 382/254, 278, 299, 305; 716/4, 19; 257/E21.525; 702/83; 356/237; 437/8; 371/22.1; 364/578; 438/16, 14; 700/121
See application file for complete search history.

(56) References Cited

U.S. PATENT DOCUMENTS

| | | | |
|---|---|---|---|
| 5,240,866 A | | 8/1993 | Friedman et al. ............... 437/8 |
| 5,301,129 A | * | 4/1994 | McKaughan et al. ........ 382/149 |
| 5,539,752 A | | 7/1996 | Berezin et al. ............ 371/22.1 |
| 5,544,256 A | * | 8/1996 | Brecher et al. .............. 382/149 |
| 5,787,190 A | | 7/1998 | Peng et al. .................. 382/145 |
| 5,859,698 A | | 1/1999 | Chau et al. .................. 356/237 |
| 5,886,909 A | | 3/1999 | Milor et al. ................. 364/578 |
| 5,913,105 A | | 6/1999 | McIntyre et al. ............. 438/16 |
| 5,949,901 A | * | 9/1999 | Nichani et al. ............. 382/149 |
| 5,982,920 A | | 11/1999 | Tobin, Jr. et al. .......... 382/145 |
| 5,991,699 A | | 11/1999 | Kulkarni et al. .............. 702/83 |
| 6,210,983 B1 | | 4/2001 | Atchison et al. ............. 438/14 |
| 6,246,787 B1 | | 6/2001 | Hennessey et al. ......... 382/141 |
| 6,292,582 B1 | | 9/2001 | Lin et al. .................... 382/149 |
| 6,338,001 B1 | | 1/2002 | Steffan et al. .............. 700/121 |
| 6,477,685 B1 | * | 11/2002 | Lovelace ....................... 716/4 |

OTHER PUBLICATIONS

U.S. Appl. No. 09/351,540, filed Jul. 12, 1999, Entitled "Automatic Defect Source Classification," Inventors: Kirsch, Travis; Hance, Byron; Webb, Carroll.

* cited by examiner

Primary Examiner—Sheela Chawan
(74) Attorney, Agent, or Firm—Hamilton & Terrile, LLP; Gary W. Hamilton

(57) ABSTRACT

A method and apparatus for analyzing patterns in semiconductor wafers wherein the patterns are compared to a plurality of patterns stored in a common pattern library. A spatial pattern recognition engine is operable to receive a first set of data corresponding to a pattern on a semiconductor wafer and to generate a normalized contour representation of said first data set. A pattern analyzer compares the normalized data set to a plurality of reference contour data sets stored in a common pattern data reference library and generates a correlation label associating the first data set with one of the plurality of reference contour data sets. The label associated with the first data set is stored in a label storage database that can be accessed to perform subsequent analysis on the data associated with a specific wafer. The system can be used to analyze multiple types of patterns, including defect data, bin data, positional parameter data and in-line site data.

25 Claims, 6 Drawing Sheets

UNIVERSAL SPATIAL PATTERN RECOGNITION SYSTEM

BACKGROUND OF THE INVENTION

1. Field of the Invention

The present invention relates to the field of semiconductor manufacturing and, more particularly, to a system for universal spatial pattern recognition of data formats on semiconductor wafers.

2. Description of the Related Art

Semiconductor wafer fabrication involves complex manufacturing processes to produce integrated circuits on the surface of silicon wafers. In order to characterize the quality of a wafer, each die is associated with a wafer test bin containing an alphanumeric code that represents the type of functional and non-functional die. The collective wafer test bins are grouped to generate a bin summary or a wafer map showing the locations of faulty dice and the type of manufacturing faults associated with these dice.

A goal of semiconductor manufacturing is to attain a high yield rate from all wafers during the device lifetime. Generally, random fault patterns do not provide information on the manufacturing process that can be used to enhance the yield. Conversely, uniform or non-random fault patterns serve as a guide to provide valuable feedback to a fab for identifying the sources of faults. However, large volumes of wafers are manufactured wherein each wafer contains its own bin summary. Management of the large volumes of bin summaries is critical to identifying manufacturing faults and providing effective modifications of the manufacturing process.

Conventional fault tracking methods rely on an "eyeball" technique in which an experienced semiconductor process engineer manually examines selected sample wafers and makes his best judgment as to the cause of the faults. This "eyeball" technique is limited because the analysis is done only on selected sample wafers. This manual technique is labor intensive and time consuming. Moreover, it does not provide data storage for correlating with future test data.

Throughout the semiconductor manufacturing process, a significant amount of information is collected and related to wafers in a positional or coordinate format. These data formats lend themselves to being analyzed spatially, as well as numerically, due to the additional information provided by the coordinate data. Recognizing the pattern significance along with the other numeric references is extremely important in solving yield problems rapidly.

Accordingly, it is desirable to produce a method for automating the wafer test bin in processing of manufacturing faults on semiconductor wafers to generate a representative wafer map showing meaningful fault patterns to maximize the effectiveness of a spatial analysis system wherein all types of patterns associated numeric outputs are evaluated in or by a common platform.

SUMMARY OF THE INVENTION

The present invention provides a method and apparatus for analyzing patterns in semiconductor wafers wherein the patterns are compared to a plurality of patterns stored in a common pattern library. In one embodiment, a spatial pattern recognition engine is operable to receive a first set of data corresponding to a pattern on a semiconductor wafer and to generate a normalized contour representation of said first data set. A pattern analyzer is operable to compare the normalized data set to a plurality of reference contour data sets stored in the common pattern data reference library and to generate a correlation label associating the first data set with one of the plurality of reference contour data sets. The label associated with the first data set is stored in a label storage database that can be accessed to perform subsequent analysis on the data relating to the labeled pattern associated with a specific wafer. The system can be used to analyze multiple types of patterns, including defect data, bin data, positional parameter data and in-line site data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
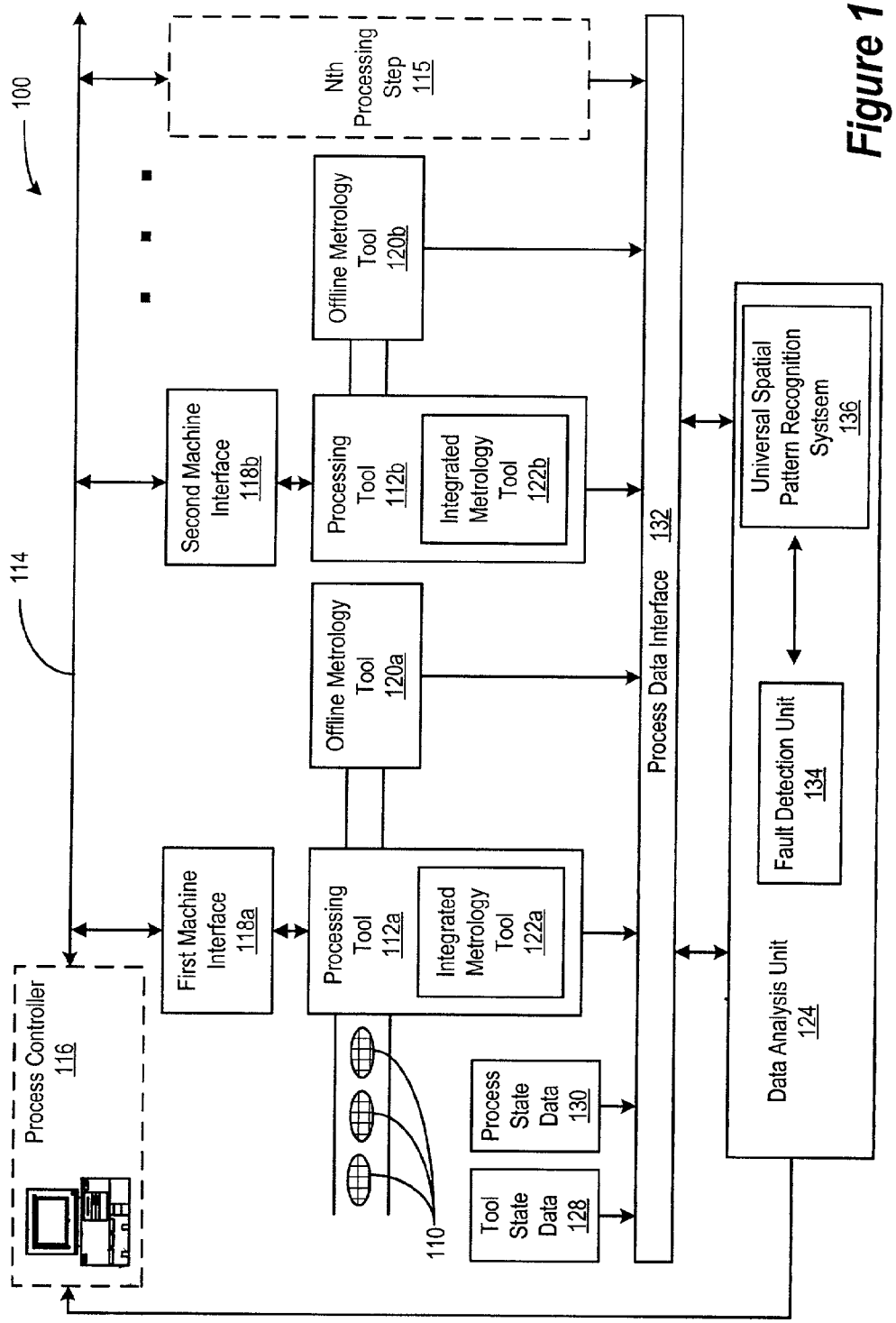
FIG. 1 is an illustration of a wafer fabrication and inspection system utilizing the universal spatial pattern recognition system of the present invention.

FIG. 1 is a block diagram of a semiconductor manufacturing line 100 that illustrates the process environment in which the Universal Spatial Pattern Recognition system of the present invention operates. Semiconductor wafers 110 are processed on processing tools 112a, 112b using a plurality of control input signals, or manufacturing parameters, provided by a computerized process controller 116 via a network 114. Control input signals or manufacturing parameters are sent to the processing tools 112a, 112b from the computerized process controller 116 via machine interfaces 118a, 118b. The first and second machine interfaces 118a, 118b are located outside the processing tools 112a, 112b. In an alternative embodiment, however, the first and second machine interfaces 118a, 111b can be located within the processing tools 112a, 112b. The semiconductor wafers 110 may be provided to the processing tools 112a, 112b in an automatic fashion (e.g., robotic movement of semiconductor wafer 110).

FIG. 1 illustrates two processing steps comprising processing tools 112a, 112b and various associated control and analysis tools. As will be understood by those skilled in the art, the semiconductor manufacturing line 100 may be comprised of any number of additional processing steps as illustrated generally by the "Nth" processing step 115. In the discussion below, the description of the processing and analysis will refer only to the first processing step comprising processing tool 112a and the associated control and analysis equipment. It will be understood by those skilled in the art that the discussion of these components also applies to the second, and Nth, processing steps as well. The process controller 116 sends control input signals, or manufacturing parameters, on the network 114 to the machine interface 118a. The process controller 116 employs a manufacturing model to generate control input signals on the network 114 and to control processing operations. The manufacturing model contains a manufacturing "recipe" that determines a plurality of control input parameters that are sent via the network 114 to the processing tool 112a.

The manufacturing model defines a process script and input control that implement a particular manufacturing process. The control input signals (or control input parameters) on the network 114 that are intended for processing tool "A" 112a are received and processed by the first machine interface 118a. Examples of the processing tool 112a used in semiconductor manufacturing processes are steppers, etch process tools and deposition tools.

One or more of the semiconductor wafers 110 that are processed by the processing tool 112a can also be sent to an offline metrology tool 120a for acquisition of metrology data. The offline metrology tool 120a can be an optical data acquisition tool, an overlay-error measurement tool, a critical dimension measurement tool or any tool offering positional data. Furthermore, metrology data may also be collected by the integrated metrology tool 122a within the processing tools 112a.

As can be seen in FIG. 1, the data output from the various process control and metrology tools are received by the process data interface 132 and transferred to the data analysis unit 124. Data from the integrated metrology tool 122a and the offline metrology tool 120a is collected by the data analysis unit 124 via the process data interface 132. The metrology data is a representation of a variety of physical or electrical characteristics of the devices formed on the wafers 110. For example, metrology data may be obtained relating to line width measurements, depth of trenches, sidewall angles, thickness and resistance. As described above, the data analysis unit 124 organizes, analyzes, and correlates data acquired by the metrology tools 120a and 122a to particular semiconductor wafers 110 that are to be examined.

Throughout the semiconductor manufacturing process, significant amounts of information is collected and related to a wafer(s) in a positional or coordinate format. These data formats lend themselves to being analyzed spatially, as well as numerically, due to the additional information provided by the coordinate information. The same numeric results can, therefore, be further separated or better identified if they can be characterized and evaluated spatially. For example, the same average film thickness could be obtained for a "bull's eye" thicker-than-specification result pattern as can be found for an "edge ring" thicker-than-specification result. However, the root cause of these two issues can be dramatically different. Recognizing the pattern significance along with the other numeric references is extremely important in solving yield problems rapidly.

To maximize the effectiveness of a spatial analysis system, all types of pattern associated numeric outputs must be evaluated in or by a common platform. By providing a common analysis platform, the system provides a higher degree of assurance that the same or similar patterns for differing data structures will result in a common spatial pattern being identified. The Universal Spatial Pattern Recognition system shown in FIG. 1 performs this function by processing the data from the various processing tools and metrology tools, as described in greater detail below.

Referring again to FIG. 1, the data analysis unit 124 comprises a fault detector unit 134 and the Universal Spatial Recognition System 136. The data analysis unit 124 receives data, including inline-type metrology data and offline metrology data, from the integrated metrology tool 122a and offline metrology tool 120a, respectively, and transmits the data to the USPR system 136 for processing, as described in greater detail below. The USPR 136 receives data, which includes offline and integrated data, as well as other data such as tool state data 128 and process state data 130.

The fault detector 134 correlates the data with corresponding tool state data and/or process state data, thereby expanding and/or contracting the data for fault detection analysis. The fault detection unit 134 provides fault detection data to the process controller 116, which may use the fault detection data/analysis to improve the operation of the semiconductor wafer 110 manufacture processes. The data analysis unit 124 may be a software function, a hardware circuit and/or a firmware component of a stand-alone unit or unit(s) integrated into a computer system.

Figure 2:
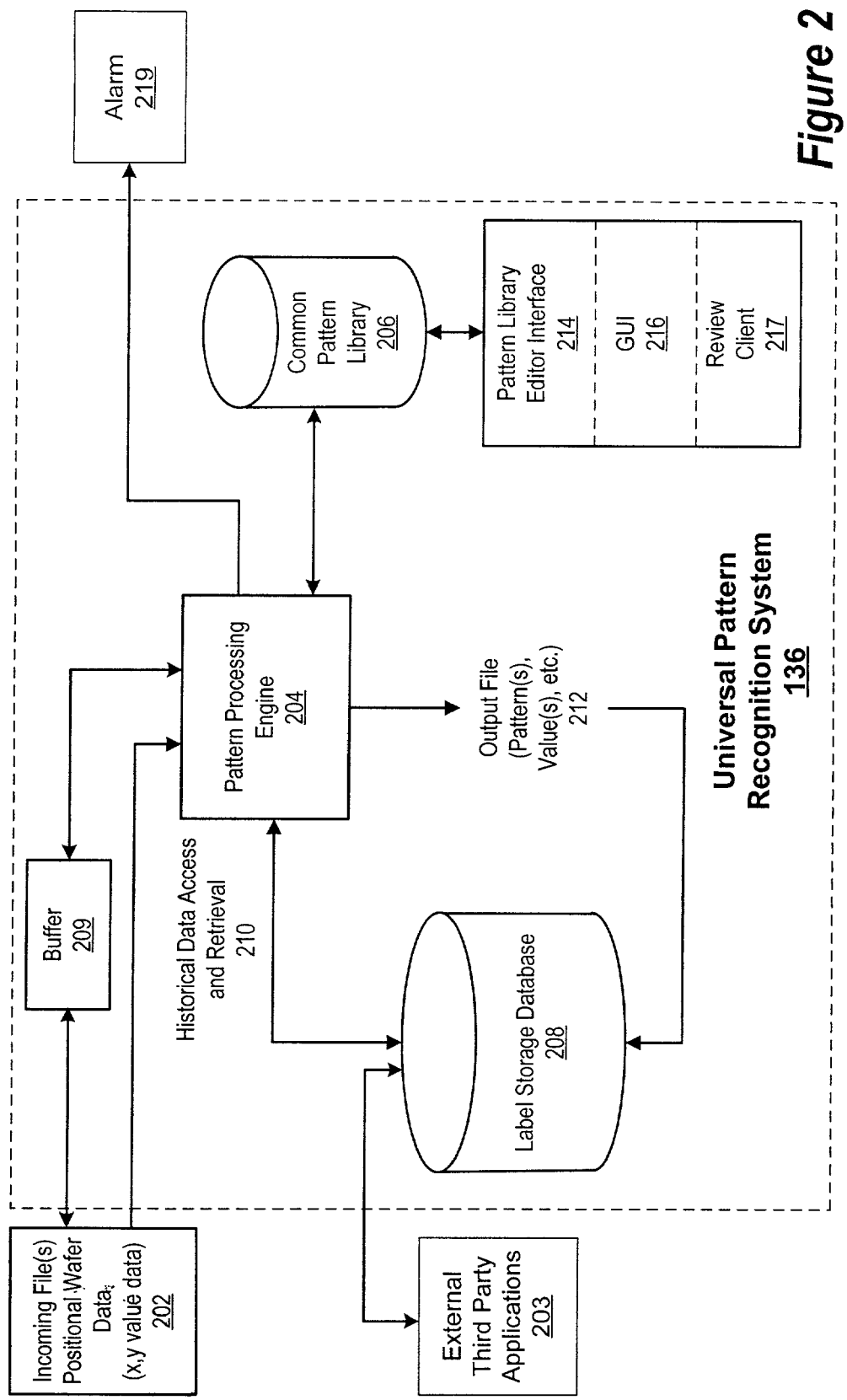
FIG. 2 is a system block diagram of the main components of the universal spatial recognition system of the present invention.

The USPR provides a common analysis technique that will provide common results for like patterns though the incoming data formats may be dissimilar. This system is capable of working in a continuous and fully automated mode, as well as in an on-request mode FIG. 2 is a system block diagram illustrating the main system components of the universal spatial pattern recognition system. Incoming data files 202 comprising (x,y) coordinate and value data relating to wafers are received by the pattern recognition engine 204. The pattern processing engine 204 is operable to process the incoming data files and to generate spatial pattern representations of the numerical data. The pattern processing engine 204 is also operable to compare the resulting spatial patterns with a plurality of reference patterns that are stored in a pattern library 206. The pattern processing engine generates output files that comprise spatial patterns 212 which are associated with their respective numerical values. These output files 212 are stored in a label storage database 208 which includes historical data on spatial patterns previously analyzed by the pattern processing engine 204 and may also include pattern data provided by another source, such as third-party applications 203. During the processing of the data files 202, the pattern processing engine 204 is operable to access and retrieve historical data 210 to determine whether a particular pattern has been detected previously and also whether a particular pattern corresponds to an alarm condition, as described in greater detail below. A buffer 209 is operably connected to store incoming data files 202 in the event that the pattern recognition engine 204 is temporarily unable to process data.

The USPR system is also capable of recognizing and processing, non-individual wafer maps or even a subset of wafer map information in both an automated and manual mode of operating. These outputs can be received, stored and evaluated by independent engineering analysis tools. The USPR system includes a graphics module to display the spatial signatures in topographical format or some other form of density curve system. The user has access to and the ability to contrast or edit the spatial patters internally in the system for pattern analysis. All stored patterns are organized in a logical hierarchical library where they can be viewed, downloaded and edited with user-definable precedence.

The USPR is operable to accept numerous data sources throughout the fabrication manufacturing facility. The file formats that can be interpreted by the USPR system include, but are not limited to: ascii, dis, hbdm, html, Klarff, oem2, text, and xml. Sources for information provided to the USPR system are: 1) in-line defect information; 2) electrical defect information (bit map or ATPG); 3) WET/SWET or WAT information; 4) in-line metrology (Tox, CD, resistance measurements); 5) sort bin results; and 6) die level parametric results. It will be understood by those skilled in the art that other sources of information can by utilized by the USPR.

The sources given above are not the complete list of possible sources to be considered. Incoming data sources can represent individual wafers, a composite of numerous wafers, or even partial information from either individual or multiple wafers. The USPR system can recognize the sources of this data and properly configure and return the outputs to their respective data storages or presentation sources. The output or results from the USPR system can be easily understood and represented in a logical data structure.

Each pattern analyzed by the pattern processing engine 204 is characterized and identified for being a part of each branch of the hierarchical tree uniquely. Along with the pattern or patterns found, if any, the output files from the pattern-processing engine 204 include a value or confidence interval indicative of how that pattern fits the pre-described and stored pattern in the library. Any new or previously un-registered patterns, found by the USPR are flagged and recorded separately for off-line analysis. The USPR system is, therefore, capable of recognizing when a historically analyzed wafer is again submitted to the system for subsequent analysis (new information). The system is, therefore, capable of recalling historical results and comparing these results to the latest results on this sample for the determination of whether this resulting pattern is historical in nature. If it is found that the pattern is historical in nature, then a resulting flag is set with the current results. The pattern processing engine 204 also tracks any alarm actions that may be specified with the matched pattern. In addition, the pattern processing engine 204 is capable of initializing alarm functionalities.

The statistical and processing condition parameters are viewable via the pattern library (described in greater detail below), via the editor interface or via a separate processing engine monitoring graphical user interface (GUI). The parameters tracked within the system include, but are not limited to: 1) quantity of patterns (wafers) processed per unit time interval, 2) the average, median processing times for the last couple of wafers, 3) current list of material in queue awaiting pattern processing, 4) status of connectivity to external data or information sources (targeted for troubleshooting purposes), and 5) processing error log and number of unknown or undetermined patterns recorded per unit interval of time.

The common pattern library 206 provides reference data for analyzing all wafer map data formats submitted to the USPR system regardless of source. Because similar patterns submitted from differing sources of information have similar pattern analysis results, the USPR provides superior matching of dissimilar data sources.

The patterns contained in the common pattern library 206 are organized along hierarchical lines. In addition to storing patterns in the library, information concerning the pattern's construction is maintained along with the pattern. This additional stored information includes, but is not limited to: 1) pattern creation or insertion date, 2) date of last pattern modification, 3) identity of individual who processed last pattern edit, 4) name and hierarchical relationship of this pattern to the database, 5) a minimum allowed tolerance for correlation between the current pattern record and a current wafer being screened, and 6) file or data type used to create this pattern and whether the pattern is active or inactive in the dataset.

The analysis provided by the pattern processing engine 204 provides the common pattern library 206 with the capability to perform self-association with respect to patterns being submitted into the system. In other words, the pattern processing engine 204 processes the incoming data to determine whether a new pattern will weaken or strengthen the hierarchical integrity of that pattern set within the common pattern library 206. Additionally, individual patterns in the library can be designated for auto-alarm triggering. If one of these patterns is detected, the USPR will follow a pre-designed alarm notification sequence. For tuning purposes, patterns can either be toggled as active or inactive in the library data set. Inactive patterns will remain in the data set. These inactive patterns are not actively used by the pattern processing engine 204 in classifying a spatial pattern. The pattern naming conventions used by the library are free form and allow the same specific pattern name to occur in more than one specific classification if these classifications are along differing branches of the hierarchical tree. For example, if there were three levels to the pattern hierarchy, a naming convention such as below would be allowed:

TABLE 1

| Major Pattern Group (MPG) | Specific Pattern Group (SPG) | Unique Pattern (UP) |
|---|---|---|
| Random | Light Density | n/a |
| Random | Heavy Density | n/a |
| Curvilinear | Single Scrape | Horitzontal @ Flat |
| Curvilinear | Single Scrape | Vertical @ Flat |
| Curvilinear | Single Scrape | Vertical @ Crown |
| Curvilinear | Single Scrape | Horizontal in center |
| Curvilinear | Dual Scrape | Horizontal @ Flat |
| Amorphous | Glob | Center |
| Amorphous | Glob | Upper Right |

The pattern library editor interface 214 can be configured as either a thin client or zero client (WEB) graphical user interface (GUI) 216. The pattern editor is capable of accepting any pattern source map for evaluation as a library candidate. The GUI 216 also allows free form drawing of patterns for submission into the library. Moreover, the GUI 216 allows the user to open up a free form drawing session with which to illustrate, create, or refine patterns for submission to the pattern library. Regardless of how a pattern map is generated—via file, or hand drawn—storing of the map will be in generic format. The pattern library interface 214 also allows the user to access, view, specify, modify, print out and store alarm action requirements that are then referenced by the individual patterns.

Figure 3:
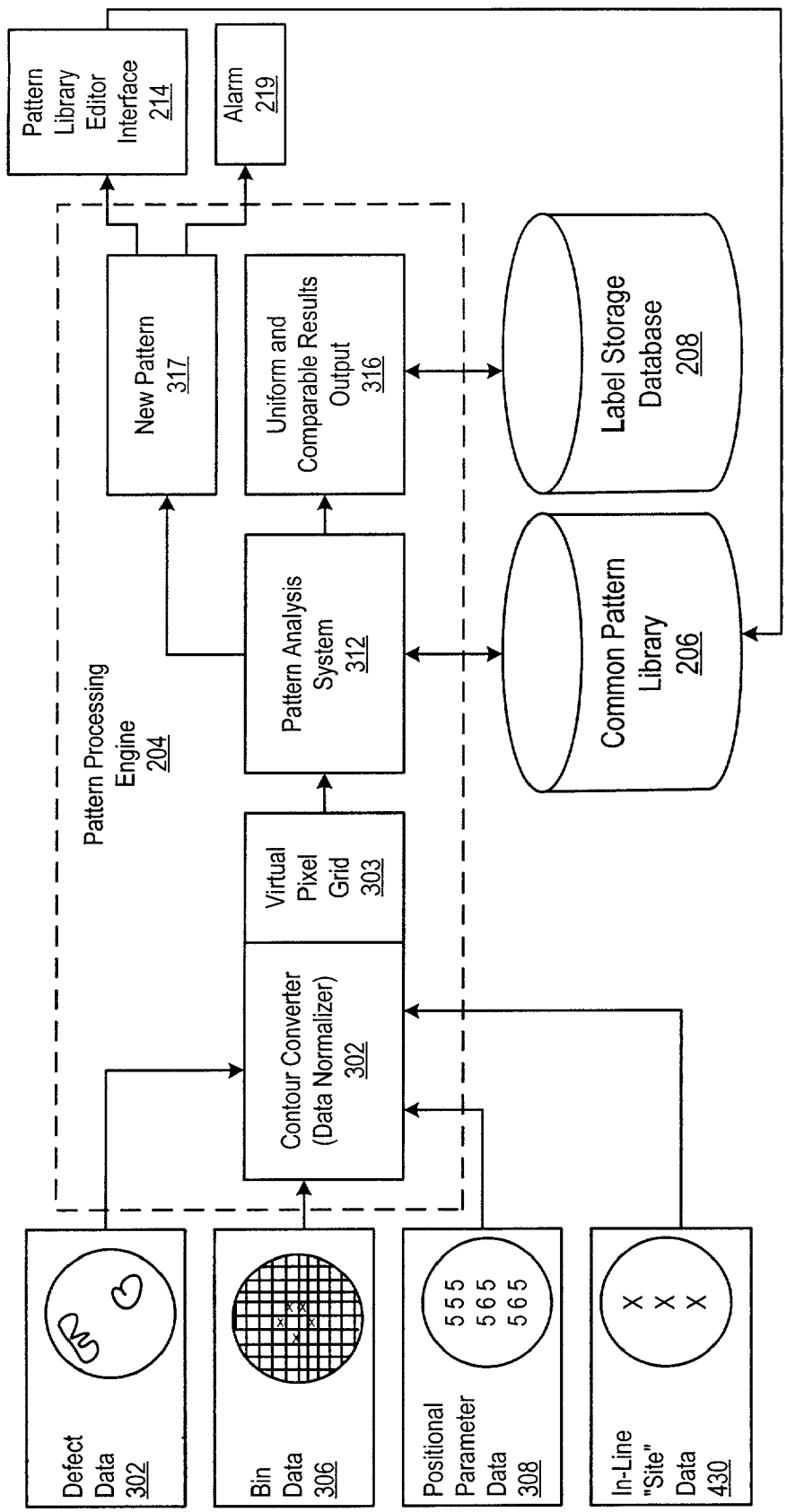
FIG. 3 is an illustration of the system components in the pattern processing engine for normalizing defect data to allow coordinate based data to be analyzed uniformly across a plurality of data sources.

FIG. 3 is a block diagram of the system components for converting any of the standard forms of wafer positional information in to a contour plot of that information. The contour converter (or data normalizer) 302 receives various pattern data in native formats and converts the data into contour plots, whereby the variety of data formats are presented in a uniform format that can be more consistently and universally analyzed to detect defects and to improve yield. The contour converter 302 uses contour plotting software to convert the defect data into contour plots. Examples of software that can be used to implement this conversion include SAS/Insight contour plotting software produced by SAS Institute, Inc. and JL Analyzer software produced by AutoFEA Engineering Software Technology, Inc. The contour converter 302 also comprises data compression software to allow downstream analysis engines to perform more efficiently. Examples of the types of data received by the contour converter 302 include Defect Data 304, Bin Data 306, Positional Diameter Data 308 and In-Line "Site" Data 310. The contour converter 302 operates in cooperation with a virtual pixel grid generator 303 that converts the pattern data into a virtual pixel format that can be processed by the pattern analysis system 312. The pattern analysis system 312 employs pattern analysis processing techniques known in the art to compare the incoming normalized contours to the various patterns stored in the common pattern library 206. For example, the pattern analysis system 312 can employ interpolation algorithms that perform relative comparisons of the patterns on a grid-to-grid basis or on a virtual pixel-to-virtual pixel basis to determine the quality of fit between the incoming normalized contour and the various patterns stored in the common pattern library 206. The pattern analysis system 312 directs the processed data relating to the normalized contour files to either the uniform results output 316 or to the unknown/new pattern output 317. If the pattern analysis system 312 determines that the incoming normalized contour pattern matches a pattern contained in the common pattern library 206, the processed data is directed to the uniform and comparable results output 316 with the result being stored in the label storage database 208. If, however, the pattern analysis system determines that the incoming normalized contour pattern does not match any of the patterns stored in the common pattern library 206, then the processed data is directed to the pattern library editor interface 214 to allow a system operator to determine whether the contour pattern being analyzed represents a new pattern that should be added to the common pattern library 206. An appropriate system alarm 219 can be activated by the system operator via the pattern library editor interface 214 or can be activated automatically by pattern processing engine 204.

Figure 4:
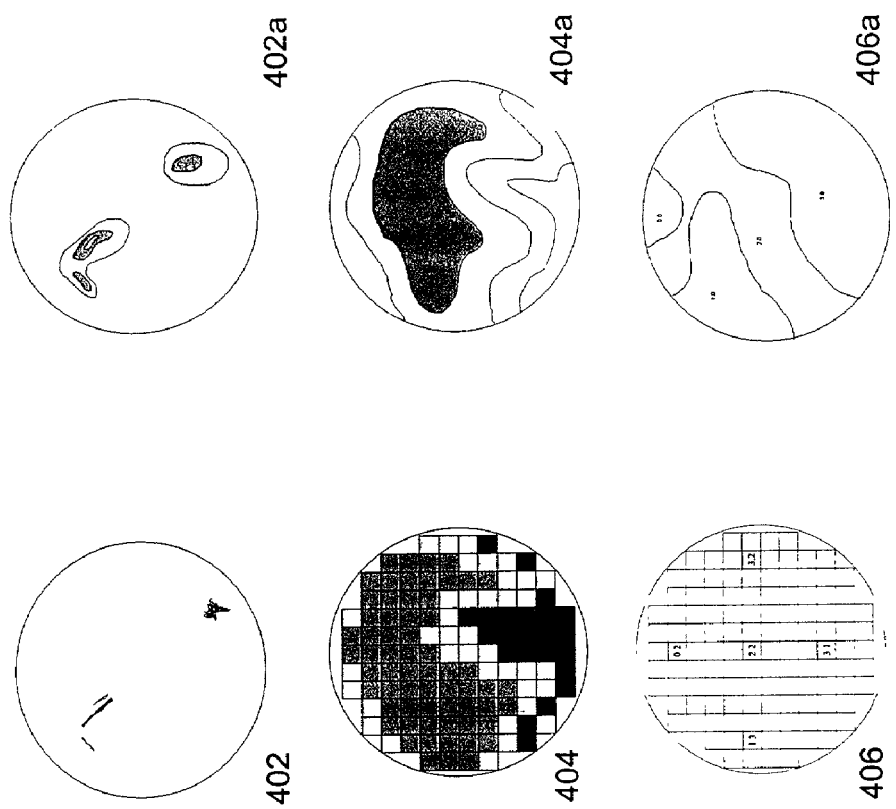
FIG. 4 is an illustration of a plurality of defect patterns and their associated contour pattern representations generated by the universal pattern recognition system of the present invention.

FIG. 4 is an illustration of a plurality of defect patterns and their associated contour pattern representations generated by the universal pattern recognition system. The patterns illustrated include a defect pattern 402, bin data defect pattern 404 and positional parameter defect pattern 406. The corresponding contour patterns shown include contour (defect) 402*a*, contour (bin data) 404*a* and contour (positional parameter) 406*a*.

Figure 5:
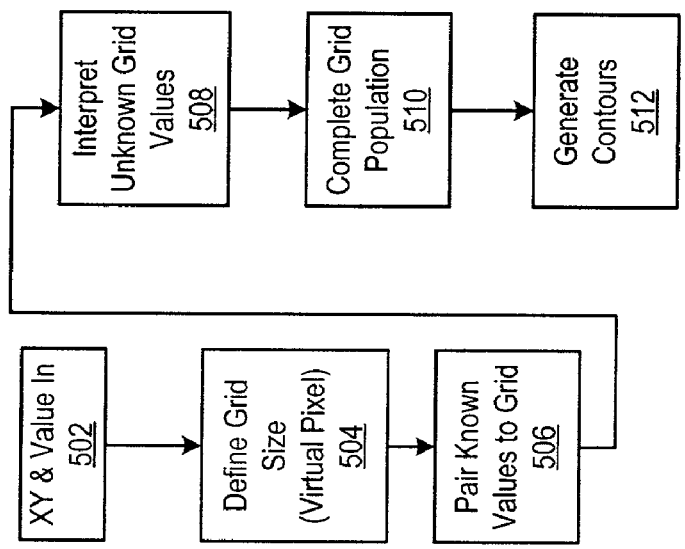
FIG. 5 is a functional flowchart of the processing steps for converting incoming pattern positional data into contour representations of wafer patterns.

FIG. 5 is a functional flowchart of the processing steps for converting incoming pattern positional data into contour representations of wafer patterns. In step 502, the contour converter 302 receives incoming data relating to a pattern on a wafer. In step 504, the contour converter defines a grid size corresponding to a plurality of virtual pixels for representing the pattern. In step 506, known values are paired to corresponding grid positions. In step 508 unknown grid values are interpreted and interpolation techniques are used to complete the grid population in step 510. Finally, in step 512, a contour is generated corresponding to the wafer pattern.

Figure 6:
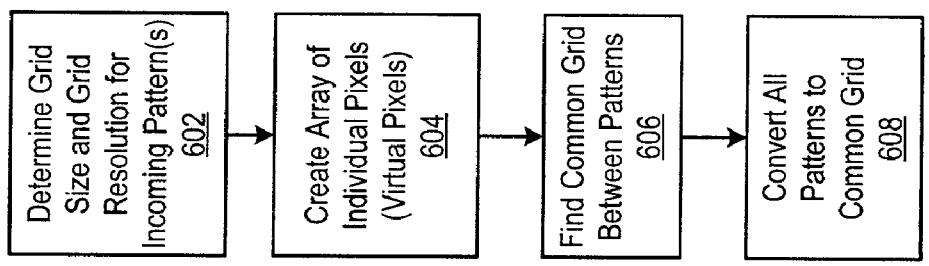
FIG. 6 is a functional flowchart of the processing steps for creating a virtual pixel representation of incoming wafer patterns.

FIG. 6 is a functional flowchart of the processing steps for creating a virtual pixel representation of incoming wafer patterns. In step 602, the virtual pixel grid generator 303 determines the grid size and grid resolution for the incoming patterns. In step 604, an array of individual virtual pixels is created. In step 606, the system identifies common grids between the patterns and then converts all patterns to the common grid in step 608.

Figure 7:
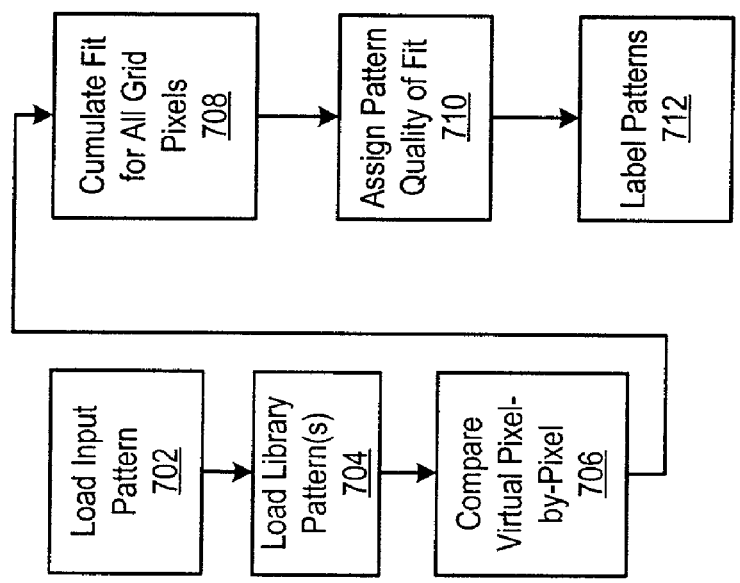
FIG. 7 is a functional flowchart of the processing steps for analyzing wafer patterns by comparing the normalized contours to contours stored in a common pattern library.

FIG. 7 is a functional flowchart of the processing steps for analyzing the patterns by comparing the normalized contours of wafer patterns to contours stored in a common pattern library. In step 702, the pattern analysis system loads the input patterns and, in step 704, the common library patterns are loaded. In step 706, the input pattern is compared to the library patterns by comparing individual pixels. In step 708, a cumulative fit is calculated for all grid pixels and a quality of fit is assigned in step 710. Finally, in step 712 a label is assigned to the incoming pattern corresponding to a labeled pattern stored in the common pattern reference library 206.

Figure 8:
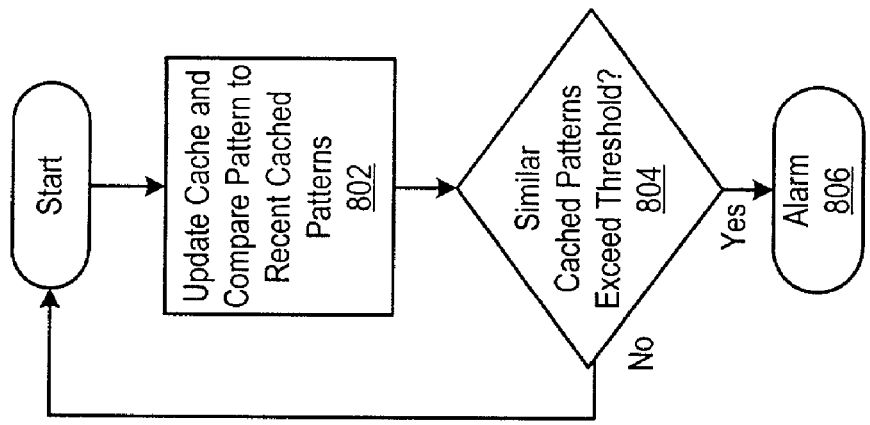
FIG. 8 is a functional flowchart of the processing steps for identifying and reporting unknown or new patterns identified by the pattern analyzer.

FIG. 8 is a functional flowchart of the processing steps for identifying and reporting unknown or new patterns identified by the pattern analyzer. If the pattern analyzer is not able to correlate the incoming pattern with a pattern stored in the common pattern library 206 during the processing steps discussed above in FIG. 7, the pattern is stored in a cache and is compared to recently cached patterns in step 802. In step 804, a test is conducted to determine if the recently cached patterns contain a significant cumulative number of similar patterns that exceeds a predetermined threshold. If the test in step 804 indicates that the predetermined threshold has been exceeded, an alarm is activated in step 806. If the test in step 804 indicates that the predetermined threshold has not been exceeded, the system resets and returns to "start."

The analysis and data normalization techniques discussed above can be used to analyze historical data relating to wafer defects or can be used to improve the operational performance of a semiconductor manufacturing system in real-time. For example, referring again to FIG. 1, the results of the contour analysis can be provided to the process controller 116 in FIG. 1 to allow the semiconductor manufacturing system to generate appropriate control signals to the processing tools to improve the yield of semiconductor wafers manufactured by the system.

OTHER EMBODIMENTS

While the method and apparatus of the present invention has been described in terms of various embodiments, it will be understood by those skilled in the art that other embodiments of the present invention are possible without departing from the scope of the invention as set forth in the claims appended hereto.

What is claimed is:

1. A system for analyzing patterns in semiconductor wafers, comprising:
    a spatial pattern recognition engine operable to receive a first set of data corresponding to a pattern on a semiconductor wafer and to generate a normalized contour representation of said first data set;
    a common pattern data reference library containing a plurality of reference contour data sets;
    a pattern analyzer operable to compare said normalized data set to said plurality of reference contour data sets and to generate a correlation label associating said first data set with one of said plurality of reference contour data sets; and
    a pixel grid generator for converting said first data set into a plurality of virtual pixels.

2. The system according to claim 1, further comprising a label storage database operable to store said normalized first data set and said label associated with said first data set.

3. The system according to claim 1, said pattern analyzer being operable to detect new patterns not contained in said common pattern reference library and to initiate an alarm indicating detection of said new pattern.

4. The system according to claim 1, further comprising a pattern library editor operable to edit the reference contour data sets in said common pattern data reference library.

5. The system according to claim 4, said pattern library editor comprising a graphical user interface.

6. The system according to claim 1, said first data set comprising defect data.

7. The system according to claim 1, said first data set comprising bin data.

8. The system according to claim 1, said first data set comprising positional parameter data.

9. The system according to claim 1, said first data set comprising in-line site data.

10. A system for analyzing patterns in semiconductor wafers, comprising:
- a plurality of process sensors for providing status data relating to the status of a semiconductor wafer process;
- a fault detector for receiving said status data and for generating a fault signal and for associating said fault signal with a first data set representing a wafer pattern;
- a spatial pattern recognition engine for generating a normalized contour representation of said data set;
- a common pattern data reference library containing a plurality of reference contour data sets; and
- a pattern analyzer operable to compare said normalized data set to said plurality of reference contour data sets and to generate a correlation label associating said first data set with one of said plurality of reference contour data sets; and
- a pixel grid generator operable to convert said first data set into a plurality of virtual pixels.

11. The system according to claim 10, further comprising a label storage database operable to store said normalized first data set and said label associated with said first data set.

12. The system according to claim 10, said pattern analyzer being operable to detect new patterns not contained in said common pattern reference library and to initiate an alarm indicating detection of said new pattern.

13. The system according to claim 10, further comprising an editor operable to edit the reference contour data sets in said common pattern data reference library.

14. The system according to claim 13, said editor comprising a graphical user interface.

15. The system according to claim 10, said first data set comprising defect data.

16. The system according to claim 10, said first data set comprising bin data.

17. The system according to claim 10, said first data set comprising positional parameter data.

18. The system according to claim 10, said first data set comprising in-line site data.

19. A method for analyzing patterns in semiconductor wafers, comprising:
- obtaining a first data set corresponding to a pattern on a wafer, said first data set being in a first format;
- converting said first data set in said first format to a second format comprising a normalized contour data representation of said first data set;
- comparing said normalized contour data representation to a plurality of reference contour patterns in a common pattern reference library; and
- generating a correlation label associating said normalized data set with one of said plurality of reference contour data sets; and
- a using a pixel grid generator to convert said first data set into a plurality of virtual pixels.

20. The method according to claim 19, further comprising the step of storing said normalized first data set and said label associated with said first data set in a label storage database.

21. The method according to claim 19, further comprising the step of detecting new patterns not contained in said common pattern reference library and initiating an alarm indicating detection of said new pattern.

22. The method according to claim 19, said first data set comprising defect data.

23. The method according to claim 19, said first data set comprising bin data.

24. The method according to claim 19, said first data set comprising positional parameter data.

25. The method according to claim 19, said first data set comprising in-line site data.

* * * * *